(12) United States Patent
Erickson

(10) Patent No.: US 6,773,210 B2
(45) Date of Patent: Aug. 10, 2004

(54) CLAMP PIN TOOL HOLDER

(75) Inventor: Robert A. Erickson, Raleigh, NC (US)

(73) Assignee: Kennametal, Inc., Latrobe, PA (US)

( * ) Notice: Subject to any disclaimer, the term of this patent is extended or adjusted under 35 U.S.C. 154(b) by 143 days.

(21) Appl. No.: 10/281,504

(22) Filed: Oct. 28, 2002

(65) Prior Publication Data

US 2004/0081521 A1 Apr. 29, 2004

(51) Int. Cl.$^7$ ................................................. B23P 15/28
(52) U.S. Cl. ........................ 407/102; 407/105; 407/107
(58) Field of Search ............................. 407/102–105, 407/107, 33, 40, 41, 46, 47, 50, 49; 408/232

(56) References Cited

U.S. PATENT DOCUMENTS

| 3,314,126 A | | 4/1967 | Stier | 29/96 |
|---|---|---|---|---|
| 3,316,616 A | | 5/1967 | Milewski | 29/96 |
| 3,777,341 A | | 12/1973 | Faber | 29/95 |
| RE27,884 E | | 1/1974 | Mihic | 29/96 |
| 3,792,516 A | | 2/1974 | Mihic | 29/96 |
| 3,848,303 A | | 11/1974 | Faber | 29/96 |
| 3,906,602 A | | 9/1975 | Kummer | 29/96 |
| 3,908,255 A | | 9/1975 | Faber | 29/96 |
| 4,244,666 A | * | 1/1981 | Erickson et al. | 407/105 |
| 4,456,409 A | | 6/1984 | Burmeister | 407/104 |
| 4,459,738 A | | 7/1984 | Buchmann | 29/588 |
| 4,615,650 A | | 10/1986 | Hunt | 407/105 |
| 4,632,593 A | | 12/1986 | Stashko | 403/316 |
| 4,636,116 A | | 1/1987 | Shikata | 407/103 |
| 4,697,963 A | | 10/1987 | Luck | 407/105 |
| 4,890,961 A | | 1/1990 | Carl et al. | 407/105 |
| 4,938,639 A | | 7/1990 | Lockard | 407/103 |
| 5,586,844 A | * | 12/1996 | Nyman | 407/105 |
| 6,599,060 B2 | * | 7/2003 | Hecht | 407/102 |

* cited by examiner

Primary Examiner—Willmon Fridie, Jr.
(74) Attorney, Agent, or Firm—Larry R. Meenan

(57) ABSTRACT

An apparatus and method for clamping an insert in a tool holder includes a recess and a clamp pin with a lever portion having a curved surface at each end thereof. The recess includes an angled wall for engaging one of the curved surfaces of the lever portion. A wedge portion is disposed within the recess and operatively coupled to a lock screw such that rotation of the lock screw causes movement of the wedge portion in a first direction. A biasing force is applied to the lever portion to cause the clamp pin to move in a second direction that is different than the first direction. The wedge portion includes one or more angled walls for engaging one of the curved surfaces of the lever portion. Movement of the wedge portion in the first direction causes the angled wall of the recess to act as a cam surface to cause the clamp pin to pivot about a pivot point, P, located along a central axis of the clamp pin.

20 Claims, 2 Drawing Sheets

CLAMP PIN TOOL HOLDER

BACKGROUND OF THE INVENTION

1. Field of the Invention

This invention relates to an apparatus and method for clamping an insert in a tool holder. More particularly, this invention relates to a tool holder that includes a lock screw coupled to a wedge portion that causes a clamp pin to pivot and clamp the insert within a pocket of the tool holder.

2. Description of the Related Art

In the past, an insert was clamped within a pocket of a tool holder by using a lock pin in combination with a top clamp. More recently, top clamps that have a segment for engaging the hole in the insert have been utilized to secure the insert within the pocket.

While these top clamp/pin combinations offer the advantage of needing only a single tool, such as a wrench, to clamp the insert, they offer the disadvantage of providing a structure that obstructs the chip flow. Thus, there is a need to provide a structure and method for securely holding an insert within a pocket of a tool holder while minimizing chip flow obstruction.

SUMMARY OF THE INVENTION

Briefly, according to this invention, there is provided an apparatus and method for clamping an insert in a tool holder. The apparatus comprises a tool holder having a recess for receiving a portion of a clamp pin that includes a lever portion having a curved surface at each end thereof. The recess includes an angled wall for engaging one of the curved surfaces of the lever portion. A wedge portion is disposed within the recess and operatively coupled to a lock screw such that rotation of the lock screw causes movement of the wedge portion in a first direction. The wedge portion includes one or more angled walls for engaging one of the curved surfaces of the lever portion. Movement of the wedge portion in the first direction causes the angled wall of the recess to act as a cam surface to cause the clamp pin to pivot about a pivot point, P, located along a central axis of the clamp pin.

In another aspect of the invention, a biasing means for biasing the clamp pin is provided, wherein the biasing means causes one of the curved surfaces of the lever portion to engage the angled wall of the recess and cause the clamp pin to move both in a second direction and in the first direction, the second direction being different than the first direction, such that the clamp pin pivots about the pivot point, P.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
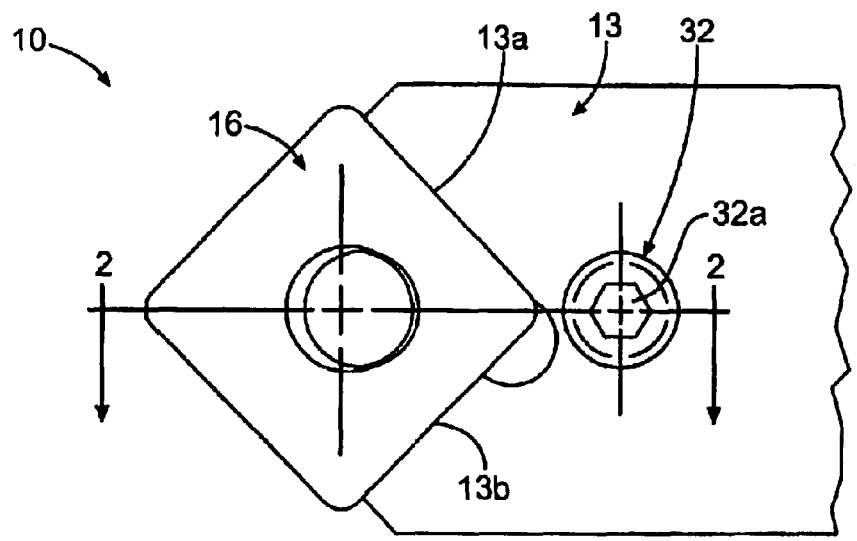
FIG. 1 is a top view of a clamp pin tool holder according to an embodiment of the invention.
Figure 2:
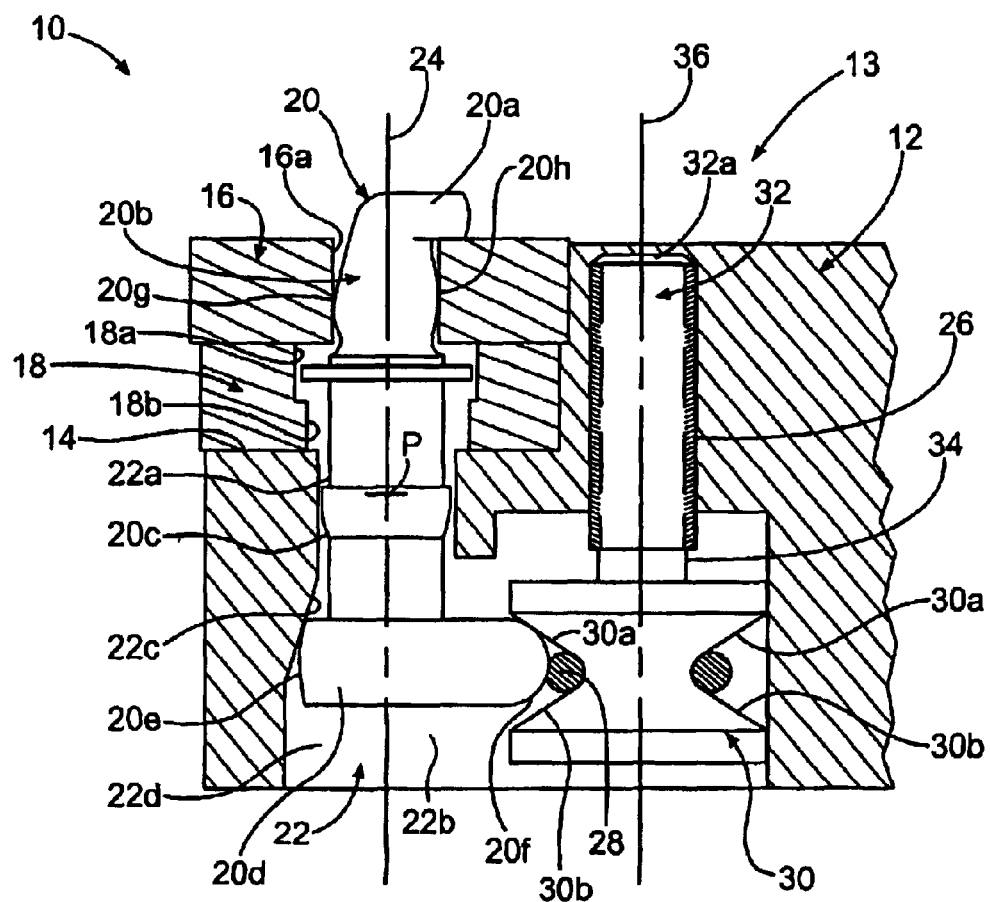
FIG. 2 is a cross sectional view of the clamp pin tool holder in a clamp position taken along line 2—2 of FIG. 1.

Referring to the drawings, wherein like reference characters represent like elements, FIGS. 1 and 2 show a clamp pin tool holder, shown generally at 10, according to an embodiment of the invention. The tool holder 10 includes a shank portion 12 and a head portion 13. The head portion 13 may be angled with respect to the shank portion 12. Formed in the head portion 13 is a seat surface 14 for supporting an insert 16 with a bore 16a. The insert 16 is also supported by side surfaces 13a, 13b. Thus, the insert 16 is held by a two-point contact defined by the side surfaces 13a, 13b and the seat surface 14 when the insert 16 is pulled back and down while in the clamped position. The tool holder 10 may also provided with a shim 18 interposed between the insert 18 and the seat structure 16. The shim may include a shim opening having a counterbore 18a and a throughbore 18b. In the illustrated embodiment, the throughbore 18b has a diameter slightly smaller than the counterbore 18a. However, the diameter of the throughbore 18b may be the same or larger than the diameter of the counterbore 18a.

The tool holder 10 includes a clamp pin, indicated generally at 20, that is situated in a recess 22 formed in the head portion 13 of the tool holder 10. An upper portion of the recess 22 defines an opening 22a extending downwardly from the seat surface 14 of generally uniform diameter. The recess 22 further includes a passageway 22b extending laterally from the upper portion to a threaded bore 26 formed in the head portion 13. One end of the passageway 22b includes an angled wall 22c that extends outwardly with respect to the central axis 24 to a lower portion 22d of the recess 22. The angled wall 22c acts as a cam surface for the clamp pin 20 as described below.

As seen in FIG. 2, the clamp pin 20 is generally an L-shaped member that extends through the bore 16a of the insert 16, through the counter bore 18a and the throughbore 18b of the shim 18, through the opening 22a and into the lower portion 22d of the recess 22. The clamp pin 20 includes a projection or clamp portion 20a extending laterally over the upper surface of the insert 16. The clamp pin 20 further includes a barrel portion 20b with two projections 20g, 20h for engaging the bore 16a of the insert 16. The barrel portion 20b has an outer diameter slightly smaller than the diameter of the bore 16a of the insert 16. The clamp pin 20 also includes a semispherical pivot surface 20c that engages the walls formed by the opening 22a of the recess 22. The clamp pin 20 also includes a lever portion 20d formed at the bottommost portion of the clamp pin 20 that extends laterally across the passageway 22b of the recess 22. The lever portion 20d includes a curved surface 20e at one end and a curved surface 20f at the opposite end. It should be noted that the curved surface 20e has a different radius of curvature than the curved surface 20f.

The lever portion 20d acts as a horizontal leg for engaging an "O" ring 28 and a wedge portion 30. The side walls of the wedge portion 30 includes a pair of angled walls 30a and 30b in which the "O" ring 28 can be securely seated therebetween. The purpose of the "O" ring 28 and the wedge portion 30 is described below. A lock screw 32 is provided in the threaded bore 26 in the head portion 13, or alternatively in the shank portion 12. The lock screw 32 is provided with a socket 32a adapted to receive an Allen wrench or other suitable tool for rotating the lock screw 32. The lock screw 32 is operatively connected to the wedge portion 30 by an intermediate portion 34, or the lock screw 32 may be directly connected to the wedge portion 30. In the illustrated embodiment, the wedge portion 30, the lock screw 32, and the intermediate portion 34 are integrally formed and concentrically disposed about a central axis 36 of the lock screw 32. Thus, the vertical movement of the lock screw 32 along the central axis 36 causes the same amount of vertical movement of the wedge portion 30 along the central axis 36. However, it will be appreciated that the invention is not limited by the geometric configuration of the wedge portion 30, the lock screw 32 and the intermediate portion 34 and other geometric configurations are within the scope of the invention.

The insert 26 is clamped against the side surfaces 13a, 13b and the seating surface 14 by rotating the lock screw 32 so that the wedge portion 30 and the lever portion 20d are urged downwardly into a clamped position, as shown in FIG. 2. More specifically, rotation of the lock screw 32 causes the wedge portion 30 to travel downward in the vertical direction along the central axis 36 of the lock screw 32. Because the angled wall 30a and the "O" ring 28 engages the curved surface 20f of the lever portion 20d, the downward travel of the wedge portion 30 causes the clamp pin 20 to travel downward in the vertical direction. At the same time as the downward travel of the clamp pin 20 in the vertical direction, the biasing force produced by the compression of the "O" ring 28 causes the lever portion 20d to engage the angled wall 22c and travel in a horizontal direction away from the lock screw 32. As a result of this vertical and horizontal travel of the clamp pin 20, the angled wall 22c acts as a cam surface to cause the clamp pin 20 to pivot about a pivot point, P, located along the central axis 24 of the clamp pin 20. The pivoting of the clamp pin 20 about the pivot point, P, causes the barrel portion 20b of the clamp pin 20 to initially engage the bore 16a of the insert 16, and then causes the clamping portion 20a to engage the top side of the insert 16 so that the insert 16 is clamped downwardly toward the seating surface 14 and inwardly toward the side surfaces 13a, 13b of the head portion 13. When the tool holder 10 is placed in the clamped position, the central axis 24 of the clamp pin 20 is substantially parallel to the central axis 36 of the lock screw 32, and the curved surface 20e of the lever portion 20d does not engage the angled wall 22c of the recess 22, as shown in FIG. 2.

Figure 3:
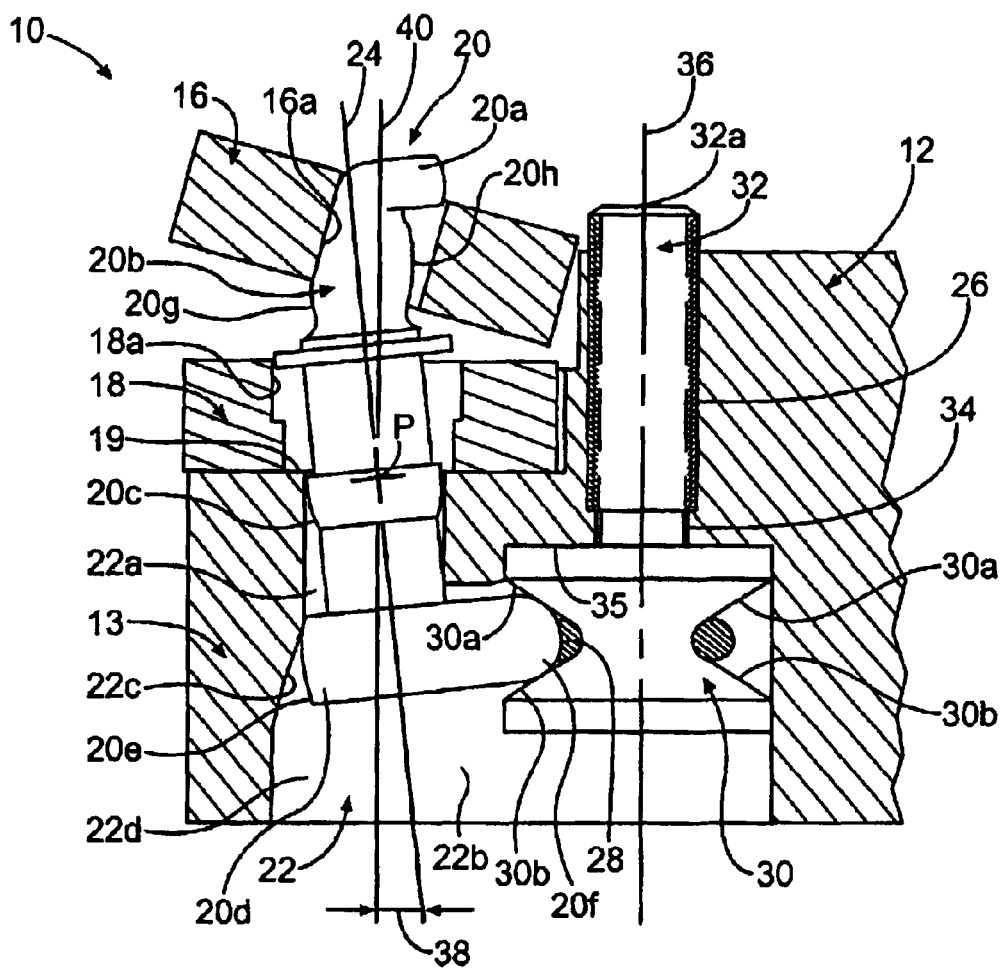
FIG. 3 is a cross sectional view of the clamp pin tool holder in a release position taken along line 2—2 of FIG. 1.

To loosen the insert 16, the lock screw 32 is rotated in the opposite direction, as shown in FIG. 3. More specifically, the rotation of the lock screw 32 causes the wedge portion 30 to travel upward in the vertical direction along the central axis 36 of the lock pin 32. An upper wall 35 of the recess 22 acts as a stop to prevent excess upward travel of the wedge portion 30 and over-rotation of the lock screw 32. However, the travel of the wedge portion 30 and the clamp pin 20 by the rotation of the lock screw 32 is only prevented in the downward direction by the contact of the clamping portion 20a with the insert 16. Therefore, variations in the thickness of the insert 16 can be accommodated in the design of the invention.

As the wedge portion 30 travels vertically upward, the curved surface 20f of the lever portion 20d engages the angled surface 30b of the wedge portion 30 and compresses the "O" ring 28. The upward travel of the wedge portion 30 causes the clamp pin 20 to travel upward in the vertical direction. At the same time as the upward travel of the clamp pin 20 in the vertical direction, the curved surface 20e of the lever portion 20d engages the angled wall 22c and acts as a cam surface to cause the clamp pin 20 to pivot about the pivot point, P, at an angle 38 with respect to a vertical axis, 40, of the tool holder 10. The angle 38 can be any suitable angle that allows the insert 16 to be removed from the tool holder 10. For example, the angle 38 may be in the range of about 2 degrees to about 10 degrees, and preferably about 5 degrees. It will be appreciated that the angle 38 can be any desired angle for enabling the insert 16 to be removed from the tool holder 10. As the lock screw 32 is rotated, the projections 20g, 20h of the barrel portion 20b will no longer engage the bore 16a of the insert 16. As the lock screw 32 is further rotated, the clamp portion 20a will no longer engages the top of the insert 16 and the insert 16 can be removed from the tool holder 10.

As mentioned above, the compression of the "O" ring 28 provides a biasing means that forces the projections 20g, 20h of the barrel portion 20b of the clamp pin 20 into initial engagement with the bore 16a of the insert 16 during clamping of the insert 16. It will be appreciated that the invention is not limited by the biasing means for biasing the clamp pin 20, and that the invention can be practiced with any desirable means for biasing the clamp pin 20. For example, as an alternative to the "O" ring 28, one or more compression springs that engage the wedge portion 30 can be housed in the lever portion 20d of the clamp pin 20.

Figure 4:
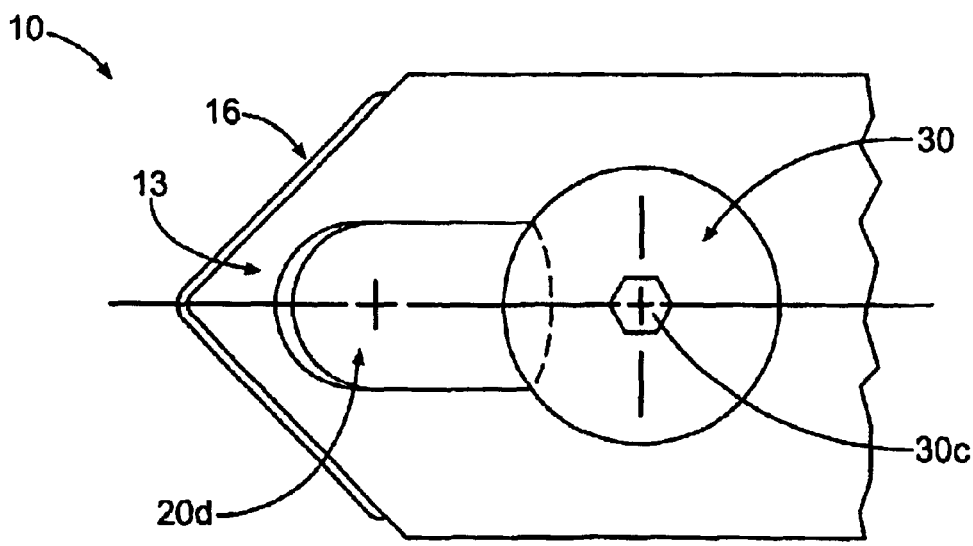
FIG. 4 is a bottom view of a clamp pin tool holder of FIG. 1.

Referring now to FIG. 4, the tool holder 10 may include another socket 30c on the wedge portion 30 such that the tool holder 10 can be accessed by the appropriate tool from the bottom of the tool holder 10. Because the wedge portion 30 is operatively coupled to the lock screw 32, rotation of the wedge portion 30 causes rotation of the lock screw 32 and moves the wedge portion 30 along the central axis 36 of the lock screw 32. The access of the socket 30c from the bottom of the tool holder 10 may be desirable in certain applications in which accessibility of the socket 32a on the lock screw 32 is difficult.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. An apparatus for clamping an insert in a tool holder, comprising:
   a clamp pin including a lever portion having a first curved surface at one end and a second curved surface at the other end, a portion of the clamp pin being positioned within a recess of the tool holder, the recess including an angled wall for engaging the first curved surface of the lever portion; and
   a wedge portion disposed within the recess and operatively coupled to a lock screw such that rotation of the lock screw causes movement of the wedge portion in a first direction, the wedge portion including one or more angled walls for engaging the second curved surface of the lever portion,
   wherein movement of the wedge portion in the first direction causes the angled wall of the recess to act as a cam surface to cause the clamp pin to pivot about a pivot point, P, located along a central axis of the clamp pin.

2. The apparatus according to claim 1, further including a biasing means for biasing the clamp pin in the second direction, the second direction being different than the first direction.

3. The apparatus according to claim 1, wherein the clamp pin further includes a clamping portion for engaging a top surface of the insert, and a barrel portion for engaging a bore of the insert.

4. The apparatus according to claim 3, wherein the barrel portion engages the bore of the insert before the clamping portion engages the top surface of the insert when the tool holder is placed in the clamped position.

5. The apparatus according to claim 1, wherein the clamp pin is capable of being pivoted about the pivot point, P, at an angle of between about 2 degrees and about 10 degrees with respect to a vertical axis of the tool holder.

6. The apparatus according to claim 1, wherein the central axis of the clamp pin is substantially parallel to a central axis of the lock screw when the tool holder is placed in a clamped position.

7. The apparatus according to claim 1, wherein the wedge portion moves in the first direction along a central axis of the lock screw.

8. Clamp pin tool holder, comprising:

a clamp pin including a lever portion having a first curved surface at one end and a second curved surface at the other end, a portion of the clamp pin being positioned within a recess of the tool holder, the recess including an angled wall for engaging the first curved surface of the lever portion;

a wedge portion disposed within the recess and operatively coupled to a lock screw such that rotation of the lock screw causes movement of the wedge portion in a first direction, the wedge portion including one or more angled walls for engaging the second curved surface of the lever portion; and biasing means for biasing the clamp pin in a second direction, wherein the clamp pin moves in both the first and second directions along the angled wall of the recess while pivoting about a pivot point, P, located along a central axis of the clamp pin.

9. The clamp pin tool holder according to claim 8, wherein the clamp pin further includes a clamping portion for engaging a top surface of the insert, and a barrel portion for engaging a bore of the insert when the tool holder is placed in a clamped position.

10. The clamp pin tool holder according to claim 9, wherein the barrel portion engages the bore of the insert before the clamping portion engages the top surface of the insert when the tool holder is placed in the clamped position.

11. The clamp pin tool holder according to claim 8, wherein the clamp pin is capable of being pivoted about the pivot point, P, at an angle of between about 2 degrees and about 10 degrees with respect to a vertical axis of the tool holder.

12. The clamp pin tool holder according to claim 8, wherein the central axis of the clamp pin is substantially parallel to a central axis of the lock screw when the tool holder is placed in a clamped position.

13. The clamp pin tool holder according to claim 8, wherein the wedge portion moves in the first direction along a central axis of the lock screw.

14. A device for clamping an insert within a pocket of a tool holder, comprising the steps of:

a clamp pin including a clamping portion for engaging a top surface of the insert, a barrel portion for engaging a bore of the insert, and lever portion having a first curved surface at one end and a second curved surface at the other end, a portion of the clamp pin being positioned within a recess of the tool holder, the recess including an angled wall for engaging the first curved surface of the lever portion; and a wedge portion disposed within the recess and operatively coupled to a lock screw such that rotation of the lock screw causes movement of the wedge portion in a first direction, the wedge portion including one or more angled walls for engaging the second curved surface of the lever portion, wherein clamp pin pivots about a pivot point, P, located along a central axis of the clamp pin such that the barrel portion of the clamp pin engages the bore of the insert before the clamping portion of the insert engages the top surface of the insert when placing the tool holder in a clamped position.

15. The device of claim 14, further including biasing means for biasing the clamp pin in a second direction.

16. The device according to claim 15, wherein the biasing means is housed in the wedge portion.

17. The device according to claim 14, wherein the clamp pin is capable of being pivoted about the pivot point, P, at an angle of between about 2 degrees and about 10 degrees with respect to a vertical axis of the tool holder.

18. The device according to claim 14, wherein the central axis of the clamp pin is substantially parallel to a central axis of the lock screw when the tool holder is placed in the clamped position.

19. The device according to claim 14, wherein the wedge portion moves in the first direction along a central axis of the lock screw.

20. The device according to claim 14, wherein a radius of curvature of the first curved surface is different than a radius of curvature of the second curved surface.

* * * * *